United States Patent Office 3,336,210
Patented Aug. 15, 1967

3,336,210
PHOTOCHEMICAL PRODUCTION OF ORGANIC
SULFONATES
Clarence L. Furrow, Bartlesville, Okla., assignor to Phillips Petroleum Company, a corporation of Delaware
No Drawing. Filed Oct. 22, 1965, Ser. No. 502,594
9 Claims. (Cl. 204—162)

This is a continuation-in-part of copending application Ser. No. 394,610, filed Sept. 4, 1964.

This invention relates to a process for the production of organic sulfonates. In another aspect, this invention relates to an improved process for the production of organic sulfonates wherein the reaction of an alkene with a bisulfite is conducted in the presence of electromagnetic radiation, a mixed solvent system comprising water and a polar organic solvent, and in the presence of a hereinafter described promoter.

Currently, there is considerable interest in and considerable research has been expended on the synthesis of biodegradable detergents. A major proportion of this research work has been devoted to the synthesis of alkylbenzene sulfonates wherein each of the substituent alkyl groups have a straight chain. Other types of detergents are also being investigated. A type of detergent which has received considerable attention is the alkyl sulfonate. Several processes for the synthesis of alkyl sulfonates have been investigated, but most of these processes have been found undesirable because of such difficulties as low yields and high cost of initiators.

Accordingly, it is an object of my invention to provide an improved process for the production of organic sulfonates.

Another object of my invention is to provide an improved process for the reaction of an alkene with an alkali metal bisulfite.

A further object of my invention is to provide an improved process for the reaction of an alkene with an alkali metal bisulfite in the presence of ultraviolet and/or visible light and a mixed solvent system comprising water and a polar organic solvent.

Other objects, advantages and features of my invention will be readily apparent to those skilled in the art from the specification and the appended claims.

In accordance with my invention, organic sulfonates are prepared by the reaction of an alkene with a bisulfite of the formula $MHSO_3$, wherein M is selected from the group consisting of sodium, potassium, lithium, rubidium and cesium. The reaction is conducted in the presence of electromagnetic radiation, a mixed solvent system comprising water and at least one polar organic solvent, and in the presence of a hereinafter described promoter.

Alkenes which are reacted with bisulfite according to the process of this invention will generally contain from about 5 to about 20 carbon atoms per molecule. While the process of this invention is suitable for the reaction of the bisulfite compounds with straight chin monoolefins, branched chain monoolefins and cyclic monoolefins, it is particularly applicable to the reaction of bisulfite compounds with straight chain olefins, preferably 1-olefins. As used herein, the term alkene includes acylic and cyclic monoolefins, including alkyl, cycloalkyl and aryl substituted derivatives thereof. Mixtures of alkenes can be employed in the process of the invention. Some specific examples of olefins which can be reacted with bisulfite compounds according to the process of this invention include 1-pentene, 2-methyl-1-butene, 1-hexene, 2-heptene, 1-octene, 1-decene, 3-undecene, 1-dodecene, 1-eicosene, 4-methyl-1-pentene, 2-methyl-1-pentadecene, 4-ethyl-2-octadecene, cyclopentene, cyclohexene, 4-ethyl-cyclohexene, cyclooctene, cyclodecene, cyclododecene, cyclohexadecene, cycloeicosene, 4-cyclohexyl-1-butene, 3-phenyl-1-butene, 6-phenyl-1-hexene, and the like.

The bisulfite employed in the proess of my invention has a formula $MHSO_3$, wherein M is selected from the group consisting of sodium, potassium, lithium, rubidium and cesium. Specific examples of such bisulfite compounds are sodium bisulfite, potassium bisulfite, lithium bisulfite, rubidium bisulfite and cesium bisulfite. The concentration of the bisulfite compound in the reaction zone preferably is sufficient to provide from 1 to 1.5 mols of the bisulfite compound per mol of alkene feed to the reaction zone. It is within the scope of this invention to employ larger amounts of bisulfite compound but these larger quantities will cause difficulty in separation of the products from the unreacted bisulfite compounds. The bisulfite compound can be introduced directly into the reaction zone or it can be introduced into the reaction zone as a water solution of the bisulfite compound.

The reaction is conducted in the presence of a mixed solvent system comprising water and at least one polar organic solvent having a relatively low absorptivity for the particular electromagnetic radiant energy (ultraviolet and/or visible light) employed. The polar organic solvent/water volume ratio will generally range from 0.1:1 to 2:1, while the quantity of water present in the reaction zone will generally range from 0.5 to about 10 grams of water per gram of the bisulfite compound present.

Suitable polar organic solvents having a relatively low absorptivity for the particular electromagnetic radiant energy of this invention and which can be employed in the cosolvent system of my invention include alcohols, ethers, amines, and the like. Low electromagnetic radiant energy absorptivity, as the term is herein employed, refers to the absorption of ultraviolet and/or visible light radiation by the polar organic solvents to such a limited degree so as to not prevent initiation of the alkene-bisulfite reaction by the ultraviolet and/or visible light radiation employed. Specific examples of suitable polar organic solvents which can be employed in the process of this invention are methyl alcohol, ethyl alcohol, n-propyl alcohol, isopropyl alcohol, n-butyl alcohol, sec-butyl alcohol, tert-butyl alcohol, n-amyl alcohol, diethyl ether, di-n-butyl ether, dioxane, tetrahydrofuran, n-butylamine, triethylamine, piperidine, and the like. Of these polar organic solvents tert-butyl alcohol is the presently preferred solvent.

The electromagnetic radiation which is employed as an initiator in the process of this invention will have a wave length generally ranging fro mabout 1000 to 8000 angstroms, thus including ultraviolet radiation and visible light, and is preferably in the range of 2000 to 4000 angstroms. The radiation dose absorbed by the alkene-bisulfite mixture will generally be from 0.001 to 1.0 einstein, preferably from 0.01 to 0.5 einstein. Any suitable source of these forms of electromagnetic radiation can be employed, including such sources as mercury vapor lamps, photo lamps, sun lamps, sunlight, and the like.

The promoter employed in the reaction is selected from the group consisting of aromatic hydrocarbon promoters and dye promoters. The aromatic hydrocarbon promoters which are utilized in the process of this invention are those which generally contain from 6 to about 50 carbon atoms and preferably will contain at least 3 rings. Specific examples of aromatic hydrocarbon promoters which can be employed in the process of my invention include naphthacene, chrysene, phenanthrene, anthracene, pyrene, p-terphenyl, biphenyl, fluorene, acenaphthene, acenaphthylene, fluoroanthrene, benzopyrene, perylene, picene, 1,2,5,6-dibenzanthracene, pentacene, 1,2,3,4-di-benzanthracene, 5, 6, 11, 12-tetraphenylnaphthacene, cholanthrene, triphenylene, benzanthracene, quaterphenyl and pyranthrene. The amount of aromatic hydrocarbon promoter present in the reaction zone can vary over a fairly wide range but will generally fall within the range between 0.0001 and 5 grams per 100 grams of alkene present in the reaction zone. A more preferred range is from 0.001 to 1 gram of aromatic hydrocarbon promoter per 100 grams of alkene.

The dye promoter employed in the process of my invention is selected from the group consisting of acridine dyes, xanthene dyes, oxazine dyes, thiazine dyes, hydroxytriarylmethane dyes, triaminotriarylmethane dyes, and triphenylmethane dyes. The preferred dyes which are utilized as promoters according to the process of this invention are selected from the group consisting of acridine and xanthene dyes. Within the group of xanthene and acridine dyes, a group of preferred promoters is represented by the following formulas:

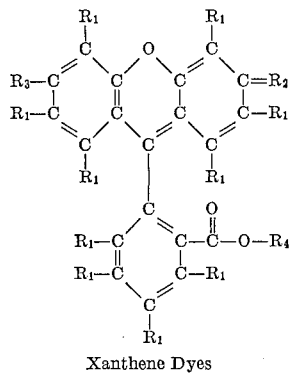

Xanthene Dyes and

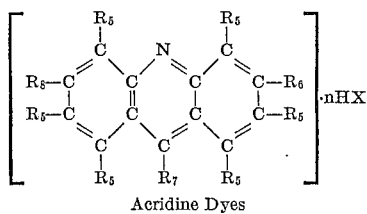

Acridine Dyes

In the above formulas, each $R_1$ is selected from the group consisting of hydrogen, methyl, ethyl, chloro, bromo and the iodo; $R_2$ is selected from the group consisting of $=O$ and $=N(R_5)_2 \cdot X$ wherein X is selected from the group consisting of Cl, Br, acetate, nitrate, sulfate, and I; $R_3$ is selected from the group consisting of $-N(R_5)_2$ and $-OM$, with $R_3$ being $-N(R_5)_2$ when $R_2$ is $=N(R_5)_2 \cdot X$ and $R_3$ being $-OM$ when $R_2$ is $=O$; $R_4$ is selected from the group consisting of hydrogen and M, wherein M is selected from the group consisting of sodium, potassium, lithium, rubidium, cesium and ammonium; $R_5$ is selected from the group consisting of hydrogen, methyl and ethyl; $R_6$ is $-N(R_5)_2$; $R_7$ is selected from the group consistin of $R_5$, phenyl

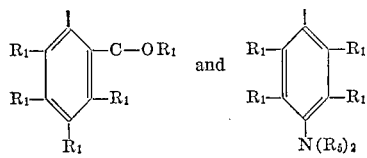

$R_8$ is selected from the group consisting of hydrogen, methyl, ethyl and $-N(R_5)_2$; and $n$ is selected from the group consisting of 0 and 1.

Examples of dyes of the above general formulas which are preferred promoters according to the process of this invention are:

(1) Disodium salt of 2,4,5,7-tetrabromo-9-o-carboxyphenyl-6-hydroxy-isoxanthone (2) 3-ethochloride of 9-o-carboxyphenyl-6-diethylamino-3-ethylimino-3-isoxanthene
(3) Dipotassium salt of 2,4,5,7-tetrabromo-9-o-carboxyphenyl-6-hydroxyisoxanthone (Eosin Y)
(4) Disodium salt of 9-o-carboxyphenyl-6-hydroxyisoxanthone (Fluorescein (di Na Salt))
(5) Dipotassium salt of 2,4,5,7-tetraiodo-9-(3,6-dichloro-o-carboxyphenyl)-6-hydroxyisoxanthone (Rose Bengal)
(6) Disodium salt of 9-o-carboxyphenyl-6-hydroxy-3-isoxanthone
(7) Disodium salt of 9-o-carboxyphenyl-6-hydroxy-4,5-diiodo-3-isoxanthone
(8) Diammonium salt of 9-o-carboxyphenyl-6-hydroxy-4,5-diiodo-3-isoxanthone
(9) Disodium salt of 4,5-dibromo-9-o-carboxyphenyl-6-hydroxy-3-isoxanthone
(10) 3-ethoacetate of 9-o-carboxyphenyl-6-diethylamino-3-ethylimino-3-isoxanthene
(11) Disodium salt of 9-o-carboxyphenyl-2,4,5,7-tetrachloro-6-hydroxy-3-isoxanthone
(12) Disodium salt of 2,4,5,7-tetrabromo-9-(3,4,5,6-tetrachloro-o-carboxyphenyl)-6-hydroxy-3-isoxanthone
(13) Chrysaniline nitrate (phosphine R)

For a more complete description of the above-listed dyes, reference is made to Encyclopedia of Chemical Technology, Interscience Encyclopedia, Inc., New York (1950), vol. 5, pages 327–354, vol. 2, pages 200–221 and vol. 14, pages 308–328.

The quantity of dye present in the reaction zone can vary over a very wide range, but will generally fall within the range between about 0.001 and 5 grams per mol of alkene introduced into the reaction zone. A more preferred range is from 0.005 to 1 gram per mol of alkene.

It is also within the scope of this invention to employ a mixture of one or more aromatic hydrocarbon promoters and one or more dye promoters.

The reaction of the alkene and bisulfite compound is conducted at a temperature ranging from the freezing point of the reaction mixture up to the boiling point of the reaction mixture and is generally less than 100° C. The pressure will generally be autogeneous and will range from about atmospheric to about 500 p.s.i., depending upon the reaction temperature, the mixed solvent system, and the like. The time of reaction will generally range from one minute to 50 hours or longer.

The reaction can be conducted either batchwise or continuous, but it is preferred to operate batchwise. The constituents in the reaction mixture can be introduced independently into the reaction zone or the various constituents can be premixed and introduced into the reaction zone as a mixture or mixtures.

Examples of organic sulfonates which can be prepared in accordance with the process of this invention include:

lithium 1-pentanesulfonate
sodium 2-methyl-1-butanesulfonate
sodium 1-hexanesulfonate
potassium 2-heptanesulfonate
rubidium 1-octanesulfonate
cesium 1-decanesulfonate
lithium 3-undecanesulfonate
sodium 1-dodecanesulfonate
potassium 1-eicosanesulfonate
sodium 4-methyl-1-pentanesulfonate
potassium 2-methyl-1-pentadecanesulfonate
lithium 4-ethyl-2-octadecanesulfonate
lithium cyclopentanesulfonate
sodium cyclohexanesulfonate
potassium 4-ethylcyclohexanesulfonate
rubidium cyclooctanesulfonate
cesium cyclodecanesulfonate
sodium cyclododecanesulfonate
potassium cyclohexadecanesulfonate
sodium cycloeicosanesulfonate potassium 4-cyclohexyl-1-butanesulfonate
sodium 6-phenyl-1-hexanesulfonate
and the like.

The sulfonates prepared by the process of this invention have wide utility, particularly in the detergent and wetting agent field. For example, the reaction of hexadecene with sodium bisulfite according to the process of this invention produces sodium hexadecanesulfonate in good yields. This compound is an excellent detergent material. By "yield," as the term is herein employed, is meant the weight percent of alkene feed charged to the reaction zone converted to the sulfonate.

After the reaction is complete, the reaction mixture can be subjected to an evaporation step wherein water, polar organic solvent and promoter are separated from the product alkyl sulfonate.

The following specific examples are presented to illustrate the objects and advantages of the invention of employing aromatic hydrocarbon or dye promoters in the reaction of an alkene with a bisulfite compound in the presence of a mixed solvent system and ultraviolet and/or visible light, but should not be construed to unduly limit the invention.

EXAMPLE I

A series of runs was conducted in which sodium bisulfite was reacted with 1-dodecene in the presence of a mixed solvent system comprising tert-butyl alcohol and water, in the presence of ultraviolet light, and in the presence or absence of an aromatic hydrocarbon promoter as indicated below in Table I.

In these runs, 40.4 grams (0.24 mol) of 1-dodecene, 31.2 grams (0.3 mol) of sodium bisulfite, 170 milliliters of tert-butyl alcohol, 170 milliliters of water and 0.05 gram of the aromatic hydrocarbon promoter (if employed), were charged to a 500 ml. 4-necked quartz flask fitted with a mechanical stirrer, two water-cooled cold fingers, a condenser and thermometer. The flask was then placed inside a Model RPR–100 Srinivasin-Rayonet-Griffin Photochemical chamber reactor, distributed by Southern New England Ultraviolet Company, Middletown, Conn., and the reaction mixture exposed to the light from sixteen 2537 A. ultraviolet lamps for 4.5 hours at 33° C. while stirring. It was determined that the reaction mixture absorbed 0.0837 einstein. At the end of the reaction time, the yield of sodium dodecyl sulfonate was determined by ASTM D1681–59T, using cetyl trimethylammonium bromide as the titrant. The results of these runs are expressed below in Table I.

TABLE I

| Run No. | Aromatic Hydrocarbon Promoter | Yield of Sodium Dodecyl Sulfonate, wt. Percent |
|---|---|---|
| 1 | Naphthacene | 75.5 |
| 2 | Chrysene | 73.0 |
| 3 | Phenanthrene | 71.9 |
| 4 | Anthracene | 69.8 |
| 5 | Pyrene | 59.0 |
| 6 | p-Terphenyl | 26.0 |
| 7 | None | 11.9 |

The results presented in the above table clearly illustrate the effectiveness of the aromatic hydrocarbon promoters to substantially increase the production of alkyl sulfonates in the reaction of an alkene and a bisulfite compound.

EXAMPLE II

A run was conducted in which sodium bisulfite was reacted with 1-dodecene in the presence of a mixed solvent system comprising tert-butyl alcohol and water, in the presence of ultraviolet light, and in the presence of 0.005 gram of anthracene as an aromatic hydrocarbon promoter. In this run, 40.4 grams of 1-dodecene, 31.2 grams of sodium bisulfite, 170 milliliters of tert-butyl alcohol, and 170 milliliters of water were charged to a 500 milliliter 4-necked quartz flask fitted with a mechanical stirrer, two water-cooled cold fingers, a condenser and thermometer. The flask was then placed inside the Model RPR–100 Srinivasin-Rayonet-Griffin Photochemical chamber reactor of Example I and the reaction mixture exposed to light from sixteen 2537 A. ultraviolet lamps for 4.5 hours at 33° C. while stirring. At the end of the reaction time, the yield of sodium dodecyl sulfonate was determined by ASTM D1681–59T, using cetyl trimethylammonium bromide as the titrant.

The weight percent yield of sodium dodecyl sulfonate obtained was 78.7. This example illustrates that high yields of alkyl sulfonate can be employed using small concentrations of aromatic hydrocarbon promoters and further illustrates that the yield of alkyl sulfonate product can be adjusted by varying the concentration of aromatic hydrocarbon promoter in the reaction zone.

EXAMPLE III

A series of runs was conducted in which various dye promoters were tested in the addition of sodium bisulfite to 1-dodecene. In these runs, a recipe of feed materials was charged to a 500 ml. 4-necked quartz flask fitted with a mechanical stirrer, two water-cooled cooling fingers, a condenser and thermometer. The recipe was as follows:

Recipe

| Feed material: | Weight in grams or volume in milliliters |
|---|---|
| 1-dodecene (0.24 mole) | g__ 40.4 |
| NaHSO$_3$ (0.3 mole) | g__ 31.2 |
| Tert-butyl alcohol | ml__ 170 |
| H$_2$O | ml__ 170 |
| Dye | gram__ 0.05 |

After charging the flask, the flask was mounted in a Model RPR–100 Srinivasin-Rayonet-Griffin Photochemical chamber reactor fitted with 16 2537 A. lamps. The reaction mixture was irradiated for 4.5 hours at 33° C., after which the yield of sodium dodecanesulfonate was determined by the procedure of ASTM D1681–59T using cetyl trimethylammonium bromide as the titrant. The results of these runs are illustrated below in Table II.

TABLE II

| Run No. | Dye Promoter [1] Used | Yield of Sodium Dodecanesulfonate, wt. Percent |
|---|---|---|
| 9 | None | 11.9 |
| 10 | Rose Bengal | 76.2 |
| 11 | Phosphine R (S.O. 687) | 77.0 |
| 12 | Fluorescein Disodium Salt | 78.8 |
| 13 | Eosin Y | 77.3 |
| 14 | Pararosanilin HCl | 26.3 |

[1] The chemical names for the first four dye promoters are listed on page 6 of the specification as dipotassium salt of 2,4,5,7-tetraiodo-9-(3,6-dichloro-o-carboxyphenyl)-6-hydroxyisoxanthone; chrysaniline nitrate; disodium salt of 9-o-carboxyphenyl-6-hydroxyisoxanthone; and dipotassium salt of 2,4,5,7-tetrabromo-9-o-carboxyphenyl-6-hydroxyisoxanthone respectively. The formula for the other dye is as follows:

Para Rosanilin Hydrochloride

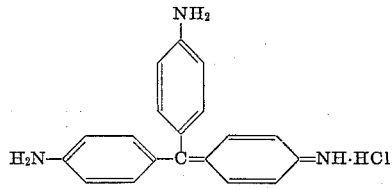

The above runs demonstrate the effectiveness of the dye promoter to substantially increase the yield of sodium dodecanesulfonate produced.

EXAMPLE IV

A further series of runs was conducted by the procedure of Example III employing only one dye, Rose Bengal. The quantity of dye promoter charged was varied. The results of these runs are expressed below in Table III.

TABLE III

| Run No. | Grams Rose Bengal | Weight percent Yield of Sodium Dodecanesulfonate | Product Appearance |
|---|---|---|---|
| 15 | 0.2 | 77.0 | Colored. |
| 16 | 0.05 | 76.2 | Do. |
| 17 | 0.005 | 75.5 | Do. |
| 18 | 0.0027 | 77.9 | No color. |
| 19 | 0.0006 | 22.4 | Do. |

The above runs demonstrate that the beneficial effects of the dye promoters can be obtained without undesirably coloring the product.

EXAMPLE V

A further series of runs was conducted by the procedure of Examples III and IV with the exception that less ultraviolet light as an initiator was employed. Results of these runs are presented below in Table IV and Run No. 18 of Table III is repeated below in Table IV for comparison purposes.

TABLE IV

| Run No. | Grams Rose Bengal | Number of 2,537 A. Lamps Employed | Weight percent Yield of Sodium Dodecanesulfonate |
|---|---|---|---|
| 18 | 0.0027 | 16 | 77.9 |
| 20 | 0.003 | 8 | 76.3 |
| 21 | 0.003 | 4 | 77.3 |
| 22 | 0.003 | 2 | 65.7 |
| 23 | 0.003 | 1 | 52.3 |

The above runs demonstrate that high yields of product can be obtained by the practice of the invention even though less than the preferred dosage of ultraviolet light was employed as an initiator.

EXAMPLE VI

A series of runs was conducted by the procedure of Example III, differing, however, from Example III in that the 16 lamps employed were 3500 A. lamps. The results of these runs are presented below in Table V.

TABLE V

| Run No. | Dye Used | Weight of Dye, Grams | Weight percent Yield of Sodium Dodecanesulfonate |
|---|---|---|---|
| 24 | Eosin Y | 0.2 | 70.3 |
| 25 | Rose Bengal | 0.2 | 77.4 |
| 26 | Phosphine R (S.O. 687) | 0.05 | 79.9 |
| 27 | Fluorescein Disodium Salt | 0.05 | 79.0 |
| 28 | None | | [1] 46.3 |

[1] Base line 3,500 A.

The above runs illustrate that high yields of sulfonates can be produced by the invention employing irradiation dosages having a wave length of 3500 A.

EXAMPLE VII

A further series of runs was conducted in which visible light was employed as the initiator. In these runs the light from a 500 watt photospot (GE RSP2) bulb was passed through a water cooling bath surrounding a Pyrex flask containing the charged mixture. The charged employed was the same as in Example III for all materials with the exception of the dye promoter. The dye promoter was employed at either 0.1 or 0.2 gram as indicated below in Table VI.

The results of these runs are presented below in Table VI.

TABLE VI

| Run No. | Dye | Weight of Dye, Grams | Weight percent Yield of Sodium Dodecanesulfonate |
|---|---|---|---|
| 29 | None | | [1] 22.1 |
| 30 | Rose Bengal | 0.2 | 72.5 |
| 31 | Phosphine R (S.O. 687) | 0.1 | 70.1 |
| 32 | Fluorescein Disodium Salt | 0.2 | 78.1 |
| 33 | Eosin Y | 0.2 | 59.5 |

[1] Avg. of 3 runs.

The above runs demonstrate the effectiveness of the invention employing visible light in combination with the dye promoter.

EXAMPLE VIII

A still further series of runs was conducted by employing room light as the source of visible light. These runs were made using the recipe of Example III using 0.05 gram Rose Bengal as the dye promoter. The runs were made at 33° C. using reaction times of 6 hours. The results of these runs are expressed below in Table VII.

TABLE VII

| Run No. | Illumination | Weight percent Yield of Sodium Dodecanesulfonate |
|---|---|---|
| 34 | [1] 3,500 A. lamp plus room light normally admitted through top Ex. III reactor. | 76.0 |
| 35 | [1] 2,537 A. lamp plus room light normally admitted through top Ex. III reactor. | 74.9 |
| 36 | No light, opaque flask | 5.48 |
| 37 | No lamps, just room light admitted through top Ex. III reactor. | 35.4 |
| 38 | Maximum room light, reaction flask mounted on lab bench. | 48.9 |
| 39 | Same as Run 38 except Rose Bengal omitted. | 5.0 |

EXAMPLE IX

A series of runs was conducted in which various dye promoters were utilized at equal absorbance levels. The absorbance of a solution is equal to:

$$\log \frac{I_0}{I} = abc$$

where $a$ is a the absorptivity, $b$ is the path length in cm., $c$ is the concentration in g./l., $I_0$ is the intensity of the light upon the solution, and $I$ is the intensity of the light transmitted by the solution. In Run 40, presented below in Table VIII, 0.003 gram of Rose Bengal was employed as the dye promoter with a calculated absorbance level of 0.163 for the solution. The other runs (Runs 41, 42, 43, 44, 45 and 46) were made using the required amount of dye promoter to obtain an absorbance of 0.163. These runs were conducted using the equipment of Example III, excluding room light, and employing the following recipe:

Recipe 1-dodecene (0.24 mole) _____grams__ 40.4
NaHSO₃ (0.30 mole) _____do____ 31.2
Tert-butyl alcohol _____do____ 170
Tert-butyl alcohol _____ml__ 170
Water _____ml__ 170
Dye _____ Variable
Temperature/time _____ 33° C./4.5 hours

TABLE VIII

| Run No. | Dye | Weight of Dye, Grams | Weight percent Yield of Sodium Dodecanesulfonate |
|---|---|---|---|
| 40 | Rose Bengal | 0.003 | 77.0 |
| 41 | S.O. 687 Phospine R | 0.0031 | 76.7 |
| 42 | Eosin Y | 0.0018 | 75.3 |
| 43 | Fluorescein (diNa Salt) | 0.0017 | 63.7 |
| 44 | Resazurin [1] | 0.0009 | 25.3 |
| 45 | Pararosanilin, HCl | 0.0036 | 22.5 |
| 46 | Methylene Blue [2] | 0.0011 | 21.6 |

[1] The formula for Resazurin is as follows:

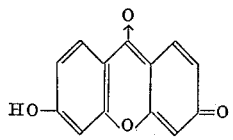

[2] The formula for Methylene Blue is as follows:

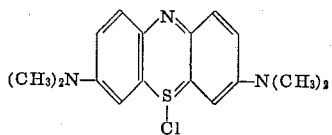

This example illustrates that the various dye promoters are effective when utilized at an equal absorbance level in the production of sulfonates.

EXAMPLE X

Three runs were carried out in which sodium bisulfite was reacted with cyclohexene in the presence of a mixed solvent system comprising tert-butyl alcohol and water and in the presence of ultraviolet radiation. In one run, no promoter was used, in the second run, Rose Bengal was employed as the promoter, and in the third run anthracene was employed as the promoter. The recipe employed for each of these runs (except for promoter) was as follows:

| Ingredient: | | Amount |
|---|---|---|
| Cyclohexene (0.24 mole) | g | 19.7 |
| NaHSO$_3$ (0.3 mole) | g | 31.2 |
| Tert-butyl alcohol | ml | 170 |
| Water | ml | 170 |

In the run employing Rose Bengal as the promoter, the amount of promoter present was 0.005 gram. In the run employing anthracene as the promoter, the amount of promoter present was 0.005 gram. All three runs were carried out at 33° C. for 4.5 hours in the previously described Rayonet photochemical reactor utilizing 16 ultraviolet lamps emitting light at 2537 angstroms. The yield of sodium cyclohexanesulfonate from the run employing no promoter was 26.4 percent, while the yield of this compound from the run employing a dye promoter was 79.0 percent. The yield of sodium cyclohexanesulfonate from the run employing anthracene was 46.9 percent. This is clearly an indication that the dyes and aromatic hydrocarbons function as promoters for the addition of alkali metal bisulfites to cyclic olefins in the presence of ultraviolet light.

EXAMPLE XI

Three runs were carried out in which sodium bisulfite was reacted with cyclohexene in the presence of a mixed solvent system comprising tert-butyl alcohol and water and in the presence of visible light. In one run, no promoter was used, in the second run, Rose Bengal was employed as the promoter, and in the third run anthracene was employed as the promoter. The recipe employed for each of these runs (except for promoter) was as follows:

| Ingredient: | | Amount |
|---|---|---|
| Cyclohexene (0.24 mole) | g | 19.7 |
| NaHSO$_3$ (0.3 mole) | g | 31.2 |
| Tert-butyl alcohol | ml | 170 |
| Water | ml | 170 |

In the run employing Rose Bengal as the promoter, the amount of promoter present was 0.003 gram. In the run employing anthracene as the promoter, the amount of promoter present was 0.005 gram. All three runs were carried out at 33° C. for 4.5 hours in the previously described Rayonet photochemical reactor utilizing 16 daylight fluorescent lamps. The yield of sodium cyclohexanesulfonate from the run employing no promoter was 42.0 percent, while the yield of this compound from the run employing a dye promoter was 75.0 percent. The yield of sodium cyclohexanesulfonate from the run employing anthracene was 71.9 percent. This is clearly an indication that the dyes and aromatic hydrocarbons function as promoters for the addition of alkali metal bisulfites to cyclic olefins in the presence of visible light.

As will be evident to those skilled in the art, various modifications of this invention can be made, or followed, in the light of the foregoing disclosure, without departing from the spirit or scope thereof.

I claim:

1. A process for the production of an alkyl sulfonate which comprises reacting in a reaction zone an alkene with a bisulfite of the formula MHSO$_3$, wherein M is selected from the group consisting of sodium, potassium, lithium, rubidium and cesium in the presence of (1) a mixed solvent system comprising water and a polar organic solvent having a low absorptivity for radiation, (2) electromagnetic radiation in the range of 1000 to 8000 angstroms, and (3) a promoter selected from the group consisting of (3a) an aromatic hydrocarbon promoter and (3b) a dye selected from the group consisting of acridine dyes, xanthene dyes, oxazine dyes, thiazine dyes, hydroxytriarylmethane dyes, triaminotriarylmethane dyes and triphenylmethane dyes.

2. The process of claim 1 wherein said promoter is one of said dyes and the concentration of said dye in said reaction zone is the range of 0.001 to 5 grams per mole of alkene introduced into said reaction zone.

3. The process of claim 2 wherein said dye is selected from the group consisting of acridine and xanthene dyes.

4. The process of claim 1 wherein said polar organic solvent comprises tert-butyl alcohol.

5. The process of claim 1 wherein said alkene comprises 1-dodecene and said bisulfite comprises sodium bisulfite.

6. The process of claim 1 wherein said promoter is an aromatic hydrocarbon promoter.

7. The process of claim 6 wherein the concentration of said aromatic hydrocarbon promoter in said reaction zone is in the range of 0.0001 to about 5 grams per 100 grams of alkene feed to said reaction zone.

8. The process of claim 1 wherein said electromagnetic radiation is ultraviolet radiation.

9. The process of claim 1 wherein said alkene is selected from the group consisting of acyclic and cyclic monoolefins, and alkyl, cycloalkyl and aryl derivatives thereof, said alkene having from 5 to 20 carbon atoms per molecule; the concentration of the said bisulfite in said reaction zone being from 1 to 1.5 mols per mol of alkene feed to said reaction zone; the polar organic solvent/water volume ratio is in the range of 0.1:1 to 2:1; the quantity of water in said reaction zone being in the range of 0.5 to 10 grams per gram of said bisulfite present in said reaction zone; said radiation being present in an amount sufficient for the reaction mixture to absorb a radiation dose in the range of 0.001 to 1.0 einstein; the temperature of said reaction zone is above the freezing point of the reaction mixture and below the boiling point of the reaction mixture; the pressure in said reaction zone is in the range from about atmospheric to about 500 p.s.i.; the reaction time is in the range of one minute to 50 hours; said aromatic hydrocarbon promoter contains from 6 to about 50 carbon atoms and contains at least three rings; and the concentration of said promoter in said reaction zone is in the range of 0.0001 to 5 grams per 100 grams of alkene present in said reaction zone for the aromatic hydrocarbon promoter and 0.001 to 5 grams per mol of alkene present in said reaction zone for the dye.

References Cited

UNITED STATES PATENTS 2,398,426  4/1946  Hanford _____ 204—162
3,048,531  8/1962  Stogryn et al. _____ 204—162

JOHN H. MACK, Primary Examiner.

H. S. WILLIAMS, Assistant Examiner.